(12) United States Patent
Song et al.

(10) Patent No.: US 9,608,265 B2
(45) Date of Patent: Mar. 28, 2017

(54) PRECURSOR OF CATHODE ACTIVE MATERIAL FOR A LITHIUM SECONDARY BATTERY, METHOD FOR MANUFACTURING THE PRECURSOR, CATHODE ACTIVE MATERIAL, AND LITHIUM SECONDARY BATTERY INCLUDING THE CATHODE ACTIVE MATERIAL

(71) Applicant: KOREA ELECTRONICS TECHNOLOGY INSTITUTE, Seongnam-si, Gyeonggi-do (KR)

(72) Inventors: Jun Ho Song, Seongnam-si (KR); Young Jun Kim, Yongin-si (KR); Jae-Hun Kim, Yongin-si (KR)

(73) Assignee: KOREA ELECTRONICS TECHNOLOGY INSTITUTE, Seongnam-si, Gyeonggi-do (KR)

( * ) Notice: Subject to any disclaimer, the term of this patent is extended or adjusted under 35 U.S.C. 154(b) by 273 days.

(21) Appl. No.: 14/347,193

(22) PCT Filed: Sep. 24, 2012

(86) PCT No.: PCT/KR2012/007652
§ 371 (c)(1),
(2) Date: Mar. 25, 2014

(87) PCT Pub. No.: WO2013/048071
PCT Pub. Date: Apr. 4, 2013

(65) Prior Publication Data
US 2014/0227594 A1    Aug. 14, 2014

(30) Foreign Application Priority Data
Sep. 26, 2011   (KR) .................. 10-2011-0097057

(51) Int. Cl.
H01M 4/48     (2010.01)
H01M 4/485    (2010.01)
(Continued)

(52) U.S. Cl.
CPC ............ *H01M 4/485* (2013.01); *C01D 15/02* (2013.01); *C01G 53/006* (2013.01); *C01G 53/04* (2013.01);
(Continued)

(58) Field of Classification Search
None
See application file for complete search history.

(56) References Cited

U.S. PATENT DOCUMENTS

2012/0115043 A1\* 5/2012 Yu ..................... H01M 4/483
429/332

FOREIGN PATENT DOCUMENTS

EP   0872450 A1   10/1998
JP   2010-251189 A   11/2010
(Continued)

OTHER PUBLICATIONS

JP 2011-116580 A English translation.\*
(Continued)

*Primary Examiner* — Scott J Chmielecki
(74) *Attorney, Agent, or Firm* — Hauptman Ham, LLP

(57) ABSTRACT

Disclosed are a precursor of a positive active material for a rechargeable lithium battery and a preparation method thereof, and a positive active material and a rechargeable lithium battery including the same, and specifically a precursor for a rechargeable lithium battery is represented by the following Chemical Formula 1, wherein a manganese ion concentration deviation in the precursor is within 3 wt %.

$Ni_xCo_yMn_{1-x-y-z}M_z(OH)_2$   [Chemical Formula 1]

(Continued)

($0<x<1$, $0\leq y<1$, $0.5\leq 1-x-y-z$, $0\leq z<1$, and M is at least one kind of metal selected from the group consisting of Al, Mg, Fe, Cu, Zn, Cr, Ag, Ca, Na, K, In, Ga, Ge, V, Mo, Nb, Si, Ti, and Zr.)

5 Claims, 7 Drawing Sheets

(51) Int. Cl.
*H01M 4/505* (2010.01)
*H01M 4/525* (2010.01)
*C01D 15/02* (2006.01)
*C01G 53/04* (2006.01)
*C01G 53/00* (2006.01)

(52) U.S. Cl.
CPC .............. *C01G 53/50* (2013.01); *H01M 4/505* (2013.01); *H01M 4/525* (2013.01); *C01P 2002/50* (2013.01); *C01P 2002/52* (2013.01); *C01P 2004/03* (2013.01); *C01P 2004/61* (2013.01); *Y02P 70/54* (2015.11)

(56) References Cited

FOREIGN PATENT DOCUMENTS

| | | | | |
|---|---|---|---|---|
| JP | 2011-065987 A | 3/2011 | | |
| JP | 2011116580 | 6/2011 | | |
| JP | 2011116580 A | * 6/2011 | | |
| JP | 2011187174 A | 9/2011 | | |
| KR | WO 2008069351 A1 | * 6/2008 | ......... | C01G 45/1242 |
| KR | 1020090105883 A | 10/2009 | | |
| KR | 1020100042145 A | 4/2010 | | |
| KR | 1020110063360 A | 6/2011 | | |
| WO | 03/044881 A1 | 5/2003 | | |
| WO | 2007114557 A1 | 10/2007 | | |
| WO | 2011/040383 A1 | 4/2011 | | |

OTHER PUBLICATIONS

JP 2011116580 A English machine translation.*
Synthesis of Li[Li1.19Ni0.16Co0.08Mn0.57]O2.*
Lee M-H et al., Synthetic optimization of Li[Ni1/3Co1/3Mn1/3] O2 via co-precipitation, Electrochimica Acta, Dec. 15, 2004, pp. 939-948, XP004632727.
Extended European Search Report received in connection with the counterpart European Patent Application No. 12836319.9 mailed on Jul. 21, 2015.
International Search Report for PCT/KR2012/007652 mailed on Mar. 26, 2013.

* cited by examiner

PRECURSOR OF CATHODE ACTIVE MATERIAL FOR A LITHIUM SECONDARY BATTERY, METHOD FOR MANUFACTURING THE PRECURSOR, CATHODE ACTIVE MATERIAL, AND LITHIUM SECONDARY BATTERY INCLUDING THE CATHODE ACTIVE MATERIAL

BACKGROUND OF THE INVENTION (a) Field of the Invention

A positive active material precursor for a rechargeable lithium battery and a preparation method thereof, and a positive active material and a rechargeable lithium battery including the same are disclosed.

(b) Description of the Related Art

As use of small portable electric/electronic devices has widely increased, a new rechargeable battery such as a nickel hydrogen battery or a rechargeable lithium battery has been actively developed. The rechargeable lithium battery uses carbon such as graphite and the like as a negative active material, a metal oxide including lithium as a positive active material, and a non-aqueous solvent as an electrolyte solution. The lithium is a metal having high ionization tendency and may realize a high voltage, and thus is used to develop a battery having high energy density.

The rechargeable lithium batteries mainly use a lithium transition metal oxide including lithium as a positive active material, and specifically, 90% or more use a layered lithium transition metal oxide such as cobalt-based and nickel-based lithium transition metal oxides, a three component-based lithium transition metal oxide in which cobalt, nickel, and manganese coexist, and the like.

However, the layered lithium transition metal oxide that is widely used as a conventional positive active material has reversible capacity of less than or equal to 200 mAh/g and thus has a limit in terms of energy density. Accordingly, in order to solve the problem of a rechargeable lithium battery due to the limited reversible capacity of a positive electrode, research on a lithium-rich layered oxide (OLO) excessively including lithium instead of the layered lithium transition metal oxide is being undertaken.

A positive active material including the lithium-rich layered oxide has a solid solution structure in which a $Li_2MnO_3$ phase is combined with the conventional layered lithium transition metal oxide, and may realize high capacity of greater than or equal to 200 mAh/g since oxygen is dissociated from the $Li_2MnO_3$, and lithium is extracted therefrom when initially charged at 4.6 V.

However, this positive active material including the lithium-rich layered oxide may not be sufficiently electrochemically activated due deteriorated particle density and non-uniform composition depending on depth when charged at a high voltage, since a uniform composition distribution is difficult to obtain during manufacture of a precursor of the positive active material. Accordingly, a battery including the lithium-rich layered metal oxide has a problem of decreased discharge capacity and aggravated manganese elution at a high temperature and a high voltage, and thus has deteriorated battery performance and cycle-life characteristics.

Therefore, attempts to increase the particle uniformity and density in the lithium-rich layered oxide have been continuously applied to improve discharge capacity and cycle-life characteristics of a battery. The present invention attempts to solve this problem and thus to improve rate capability and cycle-life characteristics of a rechargeable lithium battery by uniformly distributing transition metals inside the lithium-rich metal oxide particle.

SUMMARY OF THE INVENTION

One embodiment of the present invention provides a precursor of a positive active material for a rechargeable lithium battery in which transition metals are uniformly distributed inside a particle, and a preparation method thereof.

Another embodiment of the present invention provides a positive active material for a rechargeable lithium battery including transition metals uniformly distributed inside a particle and having high density and thus realizing discharge capacity of greater than or equal to 220 mAh/g, and a method of preparing the positive active material.

Yet another embodiment of the present invention provides a rechargeable lithium battery having excellent rate capability and cycle-life characteristics.

One embodiment of the present invention provides a precursor of a positive active material for a rechargeable lithium battery wherein the precursor is represented by the following Chemical Formula 1, and a manganese ion concentration deviation in the precursor is within 3 wt %.

$$Ni_xCo_yMn_{1-x-y-z}M_z(OH)_2 \quad \text{[Chemical Formula 1]}$$

In the above Chemical Formula 1, $0<x<1$, $0\leq y<1$, $0.5\leq 1-x-y-z$, $0\leq z<1$, and M is at least one kind of metal selected from the group consisting of Al, Mg, Fe, Cu, Zn, Cr, Ag, Ca, Na, K, In, Ga, Ge, V, Mo, Nb, Si, Ti, and Zr.

The precursor may be selected from the group consisting of $Ni_{0.2}Co_{0.1}Mn_{0.7}(OH)_2$, $Ni_{0.25}Mn_{0.75}(OH)_2$, $Ni_{0.25}Co_{0.05}Mn_{0.7}(OH)_2$, and $Ni_{0.2}Co_{0.1}Al_{0.05}Mn_{0.65}(OH)_2$.

The precursor may have an average particle diameter (D50) of about 5 μm to about 40 μm.

Another embodiment of the present invention provides a method of preparing a precursor for a rechargeable lithium battery which includes: a) preparing a metal composite aqueous solution by adding a nickel raw material, a cobalt raw material, and a manganese raw material in a desired equivalent ratio to an aqueous solution in a co-precipitation reactor; b) adding an ammonia solution and sodium hydroxide to the metal composite aqueous solution and adjusting distribution of the transition metals while pH of the obtained solution is maintained at about 10 to about 12; and c) aging the solution at a predetermined temperature for a predetermined time to obtain a metal composite oxide precursor.

In the step b), the solution may be agitated at about 1000 rpm to about 3000 rpm.

In the step c), the solution may be aged at about 10° C. to about 60° C. for about 4 hours to about 20 hours.

Yet another embodiment of the present invention provides a positive active material for a rechargeable lithium battery wherein the positive active material is represented by the following Chemical Formula 2, and a manganese ion concentration deviation in the positive active material is within 3 wt %.

$$Li_wNi_xCo_yMn_{1-x-y-z}M_zO_2 \quad \text{[Chemical Formula 2]}$$

In the above Chemical Formula 2, $0<x<1$, $0\leq y<1$, $0.5\leq 1-x-y-z$, $0\leq z<1$, and M is at least one kind of metal selected from the group consisting of Al, Mg, Fe, Cu, Zn, Cr, Ag, Ca, Na, K, In, Ga, Ge, V, Mo, Nb, Si, Ti, and Zr.

In the above Chemical Formula 2, w may be 1.3 to 1.5, and the positive active material may be selected from the group consisting of $Li_{1.3}Ni_{0.2}Co_{0.1}Mn_{0.7}O_2$, $Li_{1.3}Ni_{0.25}Mn_{0.75}O_2$, $Li_{1.3}Ni_{0.25}Co_{0.05}Mn_{0.7}O_2$, and $Li_{1.3}Ni_{0.2}Co_{0.1}Al_{0.05}Mn_{0.65}O_2$. In this way, when lithium is included in an amount of about 1.2 mol, for example, greater than or equal to about 1.3 mol, a high-capacity positive active material may be provided.

In addition, a nickel ion concentration deviation in the positive active material may be within 3 wt %.

The positive active material may have primary particles having an average particle diameter (D50) of about 100 nm to about 500 nm.

Yet another embodiment of the present invention provides a method of preparing a positive active material for a rechargeable lithium battery represented by the above Chemical Formula 1, which includes mixing the precursor in a particle and a lithium salt and agitating the mixture, and heat-treating it.

The lithium salt may be mixed in an equivalent ratio of about 1.2 to about 1.7 with the precursor.

The heat-treating may be performed at about 800° C. to about 1100° C. for about 2 hours to about 20 hours.

Yet another embodiment of the present invention provides a rechargeable lithium battery including a positive electrode including a positive active material represented by the above Chemical Formula 2; a negative electrode including a negative active material being capable of intercalating/deintercalating lithium ions; a separator interposed between the positive and negative electrodes; and a non-aqueous electrolyte, and thus having discharge capacity of greater than or equal to 220 mAh/g.

The above method provides a precursor having improved transition metal uniformity inside a particle in a relatively short time and a simple way.

A positive active material prepared by using the precursor has high density and uniformity, and may realize a rechargeable lithium battery discharge capacity of greater than or equal to about 220 mAh/g. In addition, a rechargeable lithium battery including the positive active material has excellent rate capability and cycle-life characteristics.

DETAILED DESCRIPTION

Figure 1:
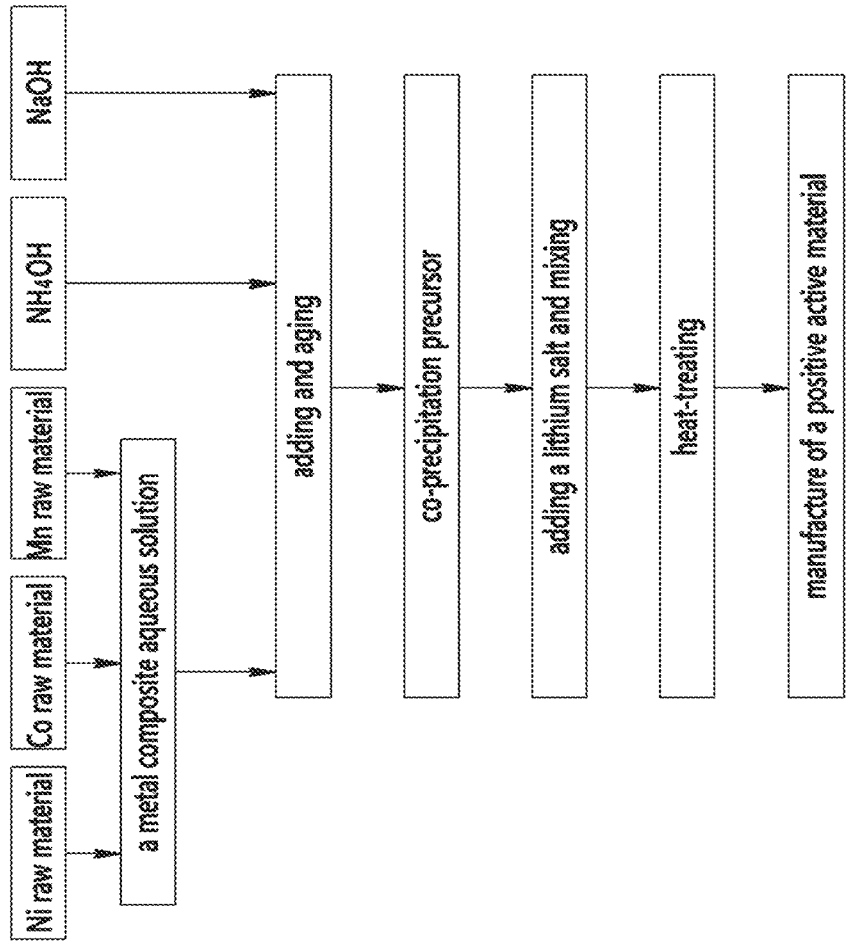
FIG. 1 is a flowchart showing a method of preparing a positive active material.

A precursor and a positive active material for a rechargeable lithium battery, a method of preparing the same, and a rechargeable lithium battery including the same are provided.

Hereinafter, embodiments of the present invention are described in detail. However, these embodiments are exemplary, and this disclosure is not limited thereto.

One embodiment of the present invention provides a precursor of a positive active material for a rechargeable lithium battery wherein the precursor is represented by the following Chemical Formula 1, and a manganese ion concentration deviation in the precursor is within 3 wt %.

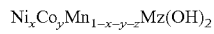   [Chemical Formula 1]

In the above Chemical Formula 1, $0<x<1$, $0\le y<1$, $0.5\le 1-x-y-z$, $0\le z<1$, and M is at least one kind of metal selected from the group consisting of Al, Mg, Fe, Cu, Zn, Cr, Ag, Ca, Na, K, In, Ga, Ge, V, Mo, Nb, Si, Ti, and Zr.

The precursor may include nickel, cobalt, and manganese, as well as other metals. Herein, the metal may be a transition metal and a rare earth element, and for example, at least one kind of metal selected from the group consisting of Al, Mg, Fe, Cu, Zn, Cr, Ag, Ca, Na, K, In, Ga, Ge, V, Mo, Nb, Si, Ti, and Zr. The manganese may be included in an amount of greater than or equal to 0.5 mol based on the total moles of all the other metals except for lithium in a metal composite oxide represented by the above Chemical Formula 1, and the nickel, cobalt, and manganese may be included in an appropriately-adjusted mole ratio depending on a purpose.

A manganese ion concentration deviation in the precursor is less than or equal to about 3 wt %, which indicates that the manganese is uniformly distributed in a concentration difference of less than or equal to about 3 wt % measured at any point of the precursor regardless of depth of the precursor.

The precursor may be selected from the group consisting of $Ni_{0.2}Co_{0.1}Mn_{0.7}(OH)_2$, $Ni_{0.25}Mn_{0.75}(OH)_2$, $Ni_{0.25}Co_{0.05}Mn_{0.7}(OH)_2$, and $Ni_{0.2}Co_{0.1}Al_{0.05}Mn_{0.65}(OH)_2$.

An average particle diameter (D50) of the precursor may be about 5 μm to about 40 μm, for example about 15 μm to about 30 μm. When the precursor has an average particle diameter of about 5 μm to about 40 μm, a positive active material may have uniform particle distribution, a more spherical shape, and higher internal density, and thus realizes a rechargeable lithium battery having high discharge capacity.

Another embodiment of the present invention provides a method of preparing the precursor of a positive active material for a rechargeable lithium battery which includes: a) preparing a metal composite aqueous solution by adding a nickel raw material, a cobalt raw material, and a manganese raw material in a desired equivalent ratio to an aqueous solution in a co-precipitation reactor; b) adjusting distribution of manganese ions by adding an ammonia solution and sodium hydroxide to the metal composite aqueous solution and agitating the mixed solution while its pH is maintained at about 10 to about 12; and c) aging the solution at a predetermined temperature for a predetermined time to obtain a metal composite oxide precursor.

The nickel raw material may be, for example, a nickel sulfate salt, a nickel nitrate salt, a nickel hydrochlorate salt, a nickel acetate salt, and the like, the cobalt raw material may be, for example, a cobalt sulfate salt, a cobalt nitrate salt, a cobalt hydrochlorate salt, a cobalt acetate salt, and the like, and the manganese raw material may be, for example, a manganese sulfate salt, a manganese nitrate salt, a manganese hydrochlorate salt, a manganese acetate salt, and the like.

In the method of preparing the positive active material precursor for a rechargeable lithium battery, the adjustment of manganese ion distribution in the precursor particle may be performed by controlling the shape of a co-precipitation reactor, a ratio between diameter and depth of the co-precipitation reactor, an agitation speed (rpm), pH of a reaction solution, and the like.

In the step b) of the method of preparing the positive active material precursor for a rechargeable lithium battery, sodium carbonate in a predetermined amount may be added to the sodium hydroxide to control thickness of primary particles of the precursor. When the sodium carbonate in a predetermined amount is included, uniformity and spherical shape of the co-precipitation precursor may be increased.

In the step b) of the method of preparing the positive active material precursor for a rechargeable lithium battery, the solution may be agitated at about 1000 rpm to about 3000 rpm. When the agitation speed is set at less than or equal to 1000 rpm, the agitation may not be uniform and may remarkably deteriorate internal composition uniformity, while the agitation speed is set at less than or greater than or equal to 3000 rpm, spherically-produced precursors may be destroyed.

In the step c) of the method of preparing the positive active material precursor for a rechargeable lithium battery, the solution may be aged at about 10° C. to about 60° C. for about 4 hours to about 20 hours, for example, at about 30° C. for about 10 hours. When the solution is aged at greater than or equal to about 60° C., an ammonia solution added thereto may be constantly volatilized and cause a pH problem, and in addition, when the aging is performed for greater than or equal to about 20 hours, there may be a problem of decreasing productivity, and simultaneously a problem of excessive growth of spherical particles, thus destroying the spherical shape.

Yet another embodiment of the present invention provides a positive active material for a rechargeable lithium battery, wherein the positive active material is represented by the following Chemical Formula 2, and a manganese ion concentration deviation in the positive active material is within 3 wt %.

  [Chemical Formula 2]

In the above Chemical Formula 2, $1.2 \leq w \leq 1.5$, $0<x<1$, $0<y<1$, $0.5 \leq 1-x-y-z$, and M is at least one kind of metal selected from the group consisting of Al, Mg, Fe, Cu, Zn, Cr, Ag, Ca, Na, K, In, Ga, Ge, V, Mo, Nb, Si, Ti, and Zr.

The positive active material represented by the above Chemical Formula 2 is a lithium-rich layered metal composite oxide including lithium in an amount of greater than or equal to about 1.2 mol and less than or equal to about 1.5 mol, and has a structure that a lithium metal composite oxide and $Li_2MnO_3$ are present as a solid solution. When a battery using the lithium metal composite oxide as a positive active material is charged at about 4.5 V to about 5.0 V, the $Li_2MnO_3$ is electrochemically activated and may realize discharge capacity of greater than or equal to about 220 mAh/g. Herein, the lithium metal composite oxide has a plateau region around about 4.6 V to about 5 V when the battery is charged at a high voltage of greater than or equal to about 4.6 V based on a positive electrode potential, and generates oxygen. The charging is not particularly limited, but may include any method that is conventionally known in a related art.

The positive active material may include nickel, cobalt, and manganese, and the nickel, cobalt, and manganese may be used in an appropriate mol ratio depending on a purpose. The manganese may be included in an amount of greater than or equal to about 0.5 mol based on the other metals except for lithium and improve structural stability, and a part of the manganese may be substituted with other elements to prolong cycle-life characteristics. The metal elements for substitution may include a transition metal, a rare earth element, or the like, for example, at least one kind of metal selected from the group consisting of Al, Mg, Fe, Cu, Zn, Cr, Ag, Ca, Na, K, In, Ga, Ge, V, Mo, Nb, Si, Ti, and Zr.

In addition, the positive active material may be selected from the group consisting of $Li_{1.3}Ni_{0.2}Co_{0.1}Mn_{0.7}O_2$, $Li_{1.3}Ni_{0.25}Mn_{0.75}O_2$, $Li_{1.3}Ni_{0.25}Co_{0.05}Mn_{0.7}O_2$, and $Li_{1.3}Ni_{0.2}Co_{0.1}Al_{0.05}Mn_{0.65}O_2$.

The positive active material may include a primary particle having an average particle diameter (D50) of about 100 nm to about 500 nm. When the primary particles of the positive active material have an average particle diameter within the range, the secondary particles of the positive active material have increased density, accomplishing a high-capacity rechargeable lithium battery.

Yet another embodiment of the present invention provides a method of preparing a positive active material for a rechargeable lithium battery which includes mixing a precursor represented by the above Chemical Formula 1 and a lithium salt, and heat-treating the mixture.

In the method of preparing the positive active material for a rechargeable lithium battery, a lithium salt may be mixed in an equivalent ratio of about 1.2 to about 1.7 with the precursor.

In the method of preparing the positive active material for a rechargeable lithium battery, the heat-treating may be performed at about 800° C. to about 1100° C. for about 2 hours to about 20 hours, for example, at about 900° C. to 1000° C. for about 15 hours.

Yet another embodiment of the present invention provides a rechargeable lithium battery including: a positive electrode including a positive active material represented by the above Chemical Formula 2; a negative electrode including a negative active material being capable of intercalating/deintercalating lithium ions; a separator interposed between the positive and negative electrodes; and a non-aqueous electrolyte, and having discharge capacity of greater than or equal to about 220 mAh/g.

The rechargeable lithium battery may have a shape such as a coin, a button, a sheet, a cylinder, a prism, and the like. The rechargeable lithium battery may be prepared in a conventional method, and this method will not be illustrated in detail. In addition, a positive electrode plate and constitution of the rechargeable lithium battery are briefly illustrated, but are not limited thereto.

The positive electrode may be prepared by dissolving the positive active material represented by the above Chemical Formula 2 along with a conductive material, a binder, and other additives, for example, at least one additive selected from a filler, a dispersing agent, an ion conductive material, a pressure enhancer, and the like in an appropriate organic solvent, preparing the solution into a slurry or paste, and then coating, drying, and compressing the slurry or paste on a current collector.

The positive electrode includes a current collector and a positive active material layer represented by the above Chemical Formula 2, and herein, the positive active material may have a coating layer on the surface, or the positive active material may be mixed with a compound having a coating layer. The coating layer may be formed by using a coating element compound such as an oxide of Mg, Al, Co, K, Na, Ca, Si, Ti, V, Sn, Ge, Ga, B, As, Zr, or a mixture thereof.

The binder may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but is not limited thereto.

The conductive material improves conductivity of an electrode, any electrically conductive material may be used as the conductive material unless it causes a chemical change, and examples thereof may be one or more of natural graphite, artificial graphite, carbon black, acetylene black, ketjen black, a carbon fiber, a metal powder, a metal fiber, and the like of copper, nickel, aluminum, silver, and the like, and a conductive material of a polyphenylene derivative and the like.

A current collector of the positive electrode may be a foil, a sheet, and the like of copper, nickel, stainless steel, aluminum, and the like, or a carbon fiber and the like.

The negative electrode includes a current collector and a negative active material layer formed on the current collector.

As the negative active material, one or two kinds of a composite oxide and the like of a carbon material such as graphite and the like or a transition metal capable of reversibly intercalating/deintercalating lithium ions may be used. Other than these materials, silicon, tin, and the like may be used as the negative electrode material.

The negative active material layer includes a binder, and may optionally include a conductive material.

The binder improves binding properties of negative active material particles with one another and with a current collector, and examples thereof may be polyvinyl alcohol, carboxylmethyl cellulose, hydroxypropyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

Examples of the conductive material may be a carbon-based material of natural graphite, artificial graphite, carbon black, acetylene black, ketjen black, a carbon fiber, and the like; a metal-based material such as a metal powder or a metal fiber and the like of copper, nickel, aluminum, silver, and the like; a conductive polymer such as a polyphenylene derivative and the like; and a mixture thereof.

The negative current collector may be a copper foil, a nickel foil, a stainless steel foil, a titanium foil, a nickel foam, a copper foam, a polymer substrate coated with a conductive metal, or a combination thereof.

The electrolyte includes a non-aqueous organic solvent and a lithium salt.

The non-aqueous organic solvent may be a carbonate-based, ester-based, ether-based, ketone-based, alcohol-based, or aprotic solvent. The carbonate-based solvent may be dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like, and the ester-based solvent may be methyl acetate, ethyl acetate, n-propyl acetate, dimethylacetate, methylpropionate, ethylpropionate, γ-butyrolactone, decanolide, valerolactone, mevalonolactone, caprolactone, and the like. The ether-based solvent may be dibutyl ether, tetraglyme, diglyme, dimethoxyethane, 2-methyltetrahydrofuran, tetrahydrofuran, and the like, and the ketone-based solvent may be cyclohexanone, and the like. The alcohol-based solvent may be ethanol, isopropyl alcohol, and the like, and the aprotic solvent may be nitriles of R—CN (R is a C2 to C20 linear, branched, or cyclic structured hydrocarbon group, and may include a double bond aromatic ring, or an ether bond) and the like, amides of dimethylformamide and the like, dioxolanes such as 1,3-dioxolane and the like, or sulfolanes and the like.

The non-aqueous organic solvent may be used singularly or in a mixture, and when the organic solvent is used in a mixture, the mixture ratio may be controlled in accordance with a desirable battery performance.

A lithium salt dissolved in such a solvent may include $LiClO_4$, $LiBF$, $LiPF_6$, $LiAlCl_4$, $LiSbF_6$, LiSCN, $LiCF_3SO$, $LiCF_3CO$, $Li(CF_3SO)$, $LiAsF_6$, $LiN(CF_3SO)$, $LiB_{10}Cl_{10}$, LiBOB (lithium bis(oxalato)borate), lower aliphatic lithium carbonate, chloroborane lithium, imides of $LiN(CF_3SO_2)$, $Li(C_2F_5SO_2)$, $LiN(CF_3SO_2)_2$, $LiN(C_2F_5SO_2)_2$, $LiN(CF_3SO_2)(C_4F_9SO_2)$, and the like. These lithium salts may be used alone or may be randomly combined in an electrolyte solution and the like unless they damage the effect of the present invention. Particularly, $LiPF_6$ may be preferably included. In addition, carbon tetrachloride, trifluorochloroethylene, or a phosphate salt and the like including phosphorus may be included in the electrolyte solution so as to make the electrolyte solution nonflammable.

The separator may be polyethylene, polypropylene, polyvinylidene fluoride, or a multi-layer of the above, and a mixed multi-layer such as a polyethylene/polypropylene double-layered separator, a polyethylene/polypropylene/polyethylene triple-layered separator, a polypropylene/polyethylene/polypropylene triple-layered separator, and the like may be used.

Hereinafter, examples of the present invention and comparative examples are described. These examples, however, are not in any sense to be interpreted as limiting the scope of the invention.

EXAMPLES

Example 1

A 1 M metal composite aqueous solution was prepared by adding nickel sulfate salt, cobalt sulfate salt, and manganese sulfate salt in a mole ratio of 0.20:0.10:0.70 to water in a co-precipitation reactor at a speed of 10 mL/min. The co-precipitation reactor had a cylindrical structure, and the diameter and depth of the co-precipitation reactor were appropriately adjusted. A 1 M ammonia solution was added to the metal composite aqueous solution in the co-precipitation reactor at a speed of 5 mL/min, and sodium hydroxide was added thereto to have pH of 11.00 through a pH controller. The metal composite aqueous solution was agitated at 1000 rpm and aged for 10 hours to increase uniformity and spherical shape of a co-precipitation precursor, preparing the spherical co-precipitation precursor including manganese ions in a concentration deviation of less than or equal to 3 wt %.

The prepared precursor was washed with ultra-pure water at greater than or equal to 30° C. until its pH became less than or equal to 8, and was dried at 80° C. for 12 hours. The dried co-precipitation precursor equivalent was dry-mixed with lithium carbonate at 1.3 times the amount thereof, and the mixture was heat-treated at 900° C. for 10 hours in the air, preparing a positive active material including manganese ions in a concentration deviation of less than or equal to 3 wt %.

Manufacture of Rechargeable Lithium Battery

The positive active material was allocated to have an average particle diameter of 25 μm, and 90 wt % of the positive active material, 5 wt % of acetylene black as a conductive material, and 5 wt % of PVdF as a binder were dissolved in NMP, preparing a slurry. This slurry was coated on a 20 μm-thick aluminum foil, dried and compressed with a press, and then dried at 120° C. for 16 hours under vacuum, preparing a disk electrode having a diameter of 16 mm. As a counter electrode, a lithium metal film punched to have a diameter of 16 mm was used, and a PP film was used for a separation membrane. As an electrolyte solution, a mixed solution obtained by dissolving 1 M $LiPF_6$ in a mixture of EC/DME in a ratio of 1:1 (v/v) was used. The electrolyte solution was impregnated into a separation membrane, this separation membrane was inserted between a working electrode and its counter electrode, and a CR2032 SUS case was used to manufacture a rechargeable lithium battery cell.

Example 2

A rechargeable battery cell was prepared according to the same method as Example 1, except for changing diameter and depth of the co-precipitation reactor and agitating the metal composite aqueous solution at 1000 rpm and maintaining its pH as 10.75 to prepare the co-precipitation precursor.

Comparative Example 1

A positive active material and a rechargeable battery cell including the same were prepared according to the same method as Example 1, except for changing diameter and depth of the co-precipitation reactor and aging the metal composite aqueous solution for 2 hours when the co-precipitation precursor was prepared.

Comparative Example 2

A positive active material and a rechargeable battery including the same were prepared according to the same method as Example 1, except for changing diameter and depth of the co-precipitation reactor and the agitation speed to 500 rpm when the co-precipitation precursor was prepared.

Comparative Example 3

A positive active material and a rechargeable battery including the same were prepared according to the same method as Example 1, except for agitating the metal composite aqueous solution at 1000 rpm while its pH was maintained at 11.25 and allowing it to stand for 2 hours when the co-precipitation precursor was prepared and by changing diameter and depth of the co-precipitation reactor.

Experimental Examples

SEM Photograph

Figure 2:
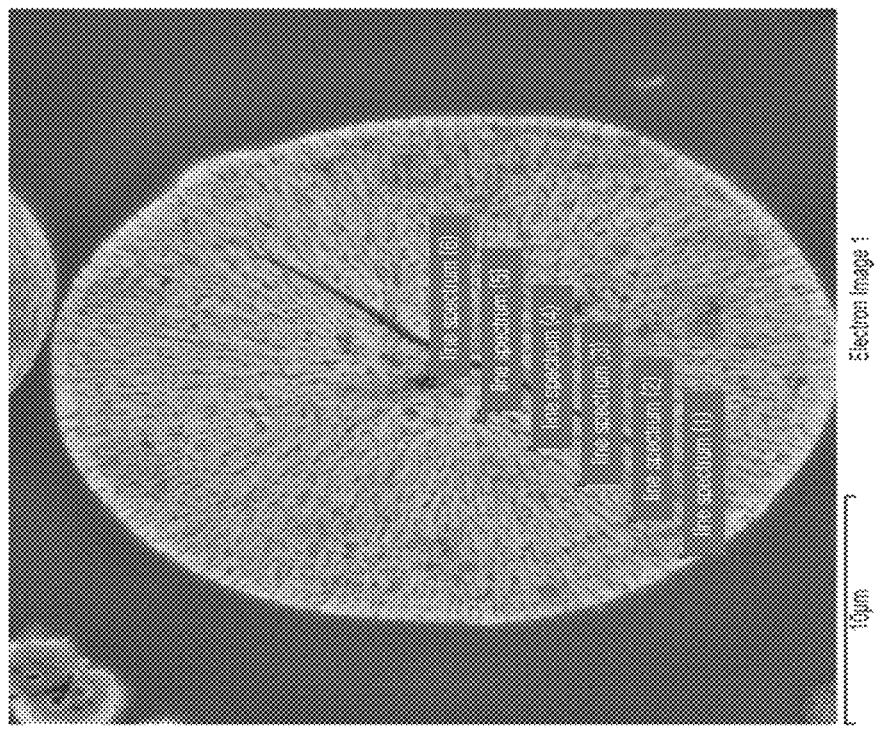
FIG. 2 shows a line spectrum obtained by measuring concentration of transition metals in a positive active material of Example 1 depending on depth.
Figure 3:
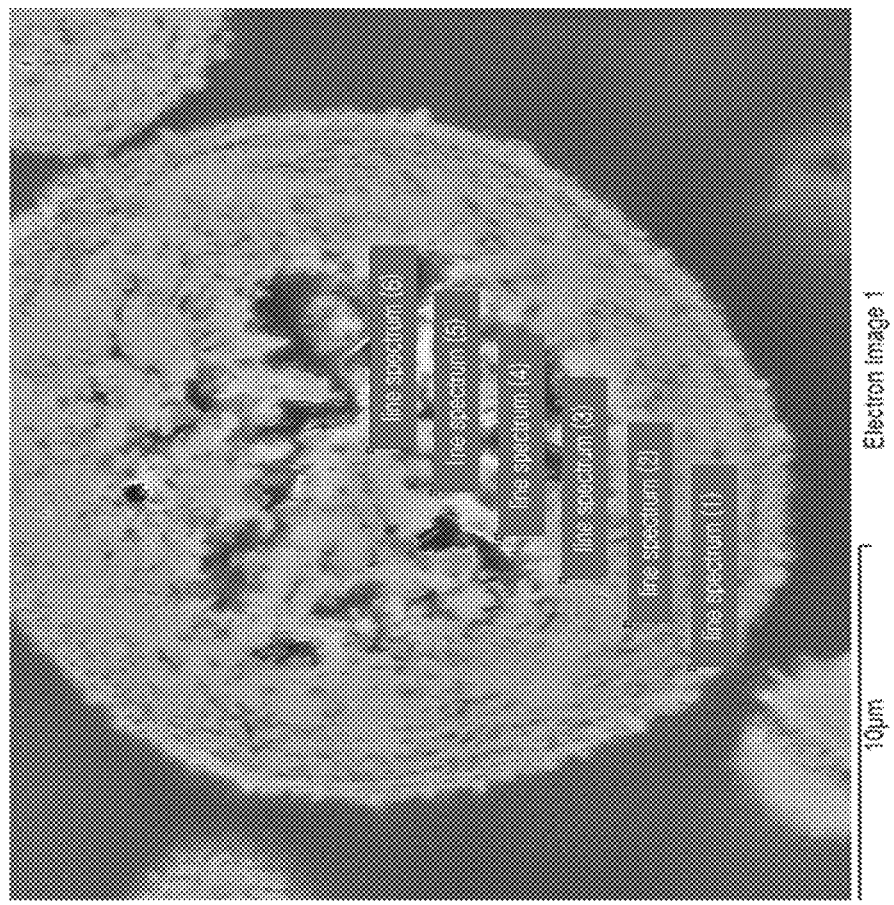
FIG. 3 shows a line spectrum obtained by measuring concentration of transition metals in a positive active material of Comparative Example 1 depending on depth.

A SEM photograph of the co-precipitation precursors according to Example 1 and Comparative Example 1 was taken by using JSM-7000F (Jeol) equipment. FIGS. 2 and 3 are cross-sectional views respectively showing primary particles of the positive active materials according to Example 1 and Comparative Example 1. Comparing FIG. 2 with FIG. 3, the primary particles of the positive active material according to Example 1 showed relatively higher internal uniformity and density than the positive active material according to Comparative Example 1.

Transition Metal Concentration in Positive Active Material: EDS Analysis

Figure 4:
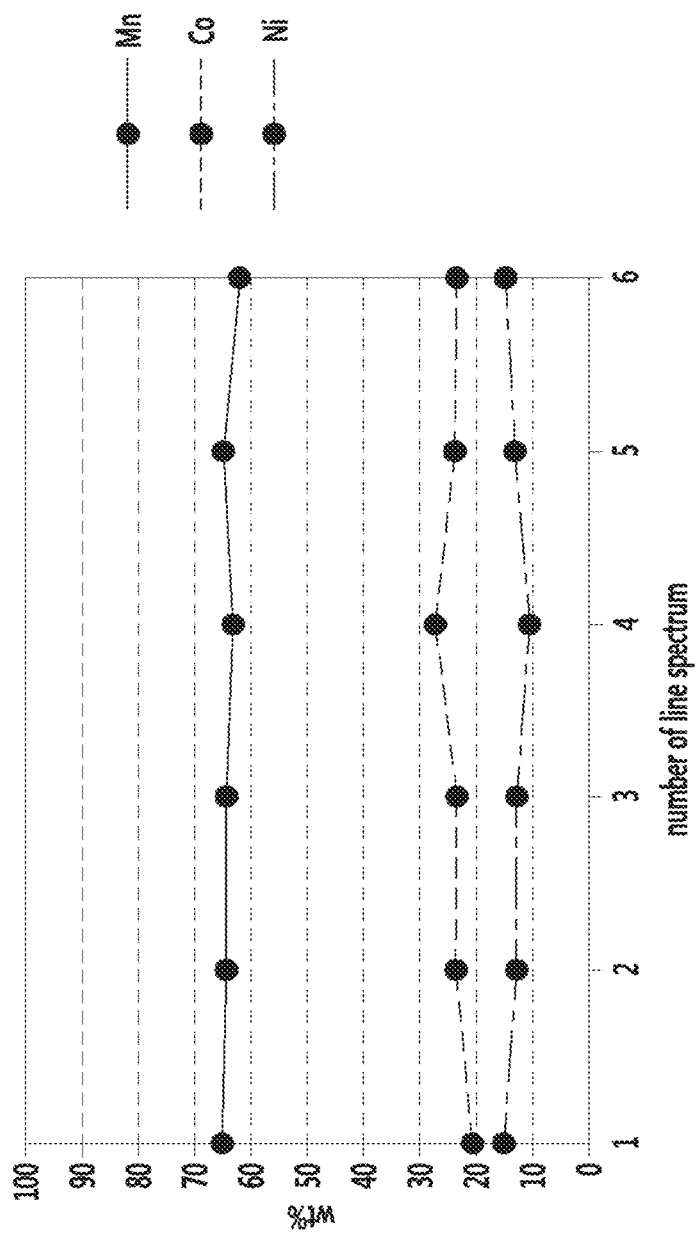
FIG. 4 shows the amount (wt %) of transition metals in the positive active material according to Example 1 depending on depth.
Figure 5:
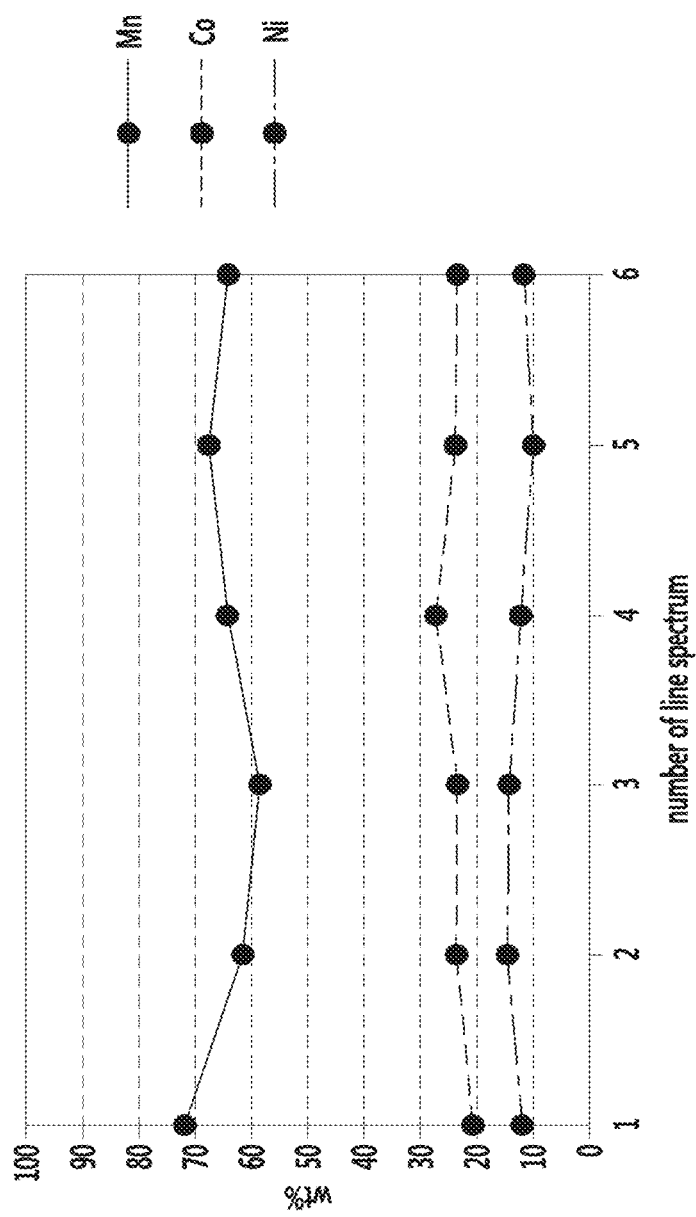
FIG. 5 shows the amount (wt %) of transition metals in the positive active material according to Comparative Example 1 depending on depth.

The positive active materials according to Example 1 and Comparative Example 1 were cut by using a cross-sectional polisher (SM-09010, Jeol), and a SEM photograph was taken of the cross-section of the positive active materials by using JSM-7000F (Jeol) equipment. As shown in FIGS. 2 and 3, each transition metal concentration (wt %) at line spectrum points 1 to 6 on the cut cross-section was measured by using EDS (energy dispersive spectroscopy, Oxford Ins.). FIGS. 4 and 5 show each transition metal concentration (wt %) measured at the line spectrum points 1 to 6. In addition, the transition metal concentrations at the spectra 1 to 6 were respectively used to calculate a transition metal deviation between any two points of the line spectra 1 to 6, and the results are provided in Table 1.

FIGS. 4 to 5 are concentration graphs of the positive active materials according to Example 1 and Comparative Example 1 depending on depth.

TABLE 1

| | Average concentration of transition metal (wt %) and deviation range (wt %) | | | | | | 0.2 C discharge capacity/mAh/g | |
|---|---|---|---|---|---|---|---|---|
| | Ni | | Co | | Mn | | | |
| | Ni | concentration deviation | Co | concentration deviation | Mn | concentration deviation | First discharge | 35th discharge |
| Example 1 | 20 | 2 | 10 | 2 | 70 | 2 | 230 | 223 |
| Example 2 | 18 | 3 | 11 | 1 | 71 | 3 | 234 | 211 |
| Comparative Example 1 | 20 | 5 | 10 | 2 | 70 | 4 | 227 | 197 |
| Comparative Example 2 | 17 | 6 | 11 | 2 | 72 | 4 | 247 | 184 |
| Comparative Example 3 | 19 | 4 | 13 | 3 | 68 | 5 | 226 | 175 |

In particular, manganese ions and nickel ions had a concentration deviation of less than or equal to 3 wt % in the positive active materials according to Examples 1 and 2, as shown in Table 1.

On the contrary, the concentration deviation of nickel ions and manganese ions in Comparative Example 1 to 3 was greater than or equal to 4 wt %. Accordingly, when a co-precipitation precursor was prepared by controlling internal composition distribution according to the examples, a positive active material including the co-precipitation precursor had uniform internal composition having a manganese ion concentration deviation of less than 3 wt %.

Hereinafter, charge and discharge of battery cells prepared by using the positive active materials according to Examples 1 and 2 and Comparative Examples 1 to 3 were experimentally evaluated to determine performance of a battery including the positive active material having a uniform internal composition.

Charge and Discharge Characteristic of Rechargeable Lithium Battery

The positive active materials of Example 1 and Comparative Example 1 were respectively used to manufacture each battery cell for testing an electrode, the battery cell was charged and discharged 35 times at room temperature of 25° C. and a discharge speed of 0.2 C, discharge capacity of the battery cell was measured by using TOSCAT-3000 (TOYO) equipment, and the results are provided in Table 1.

Figure 6:
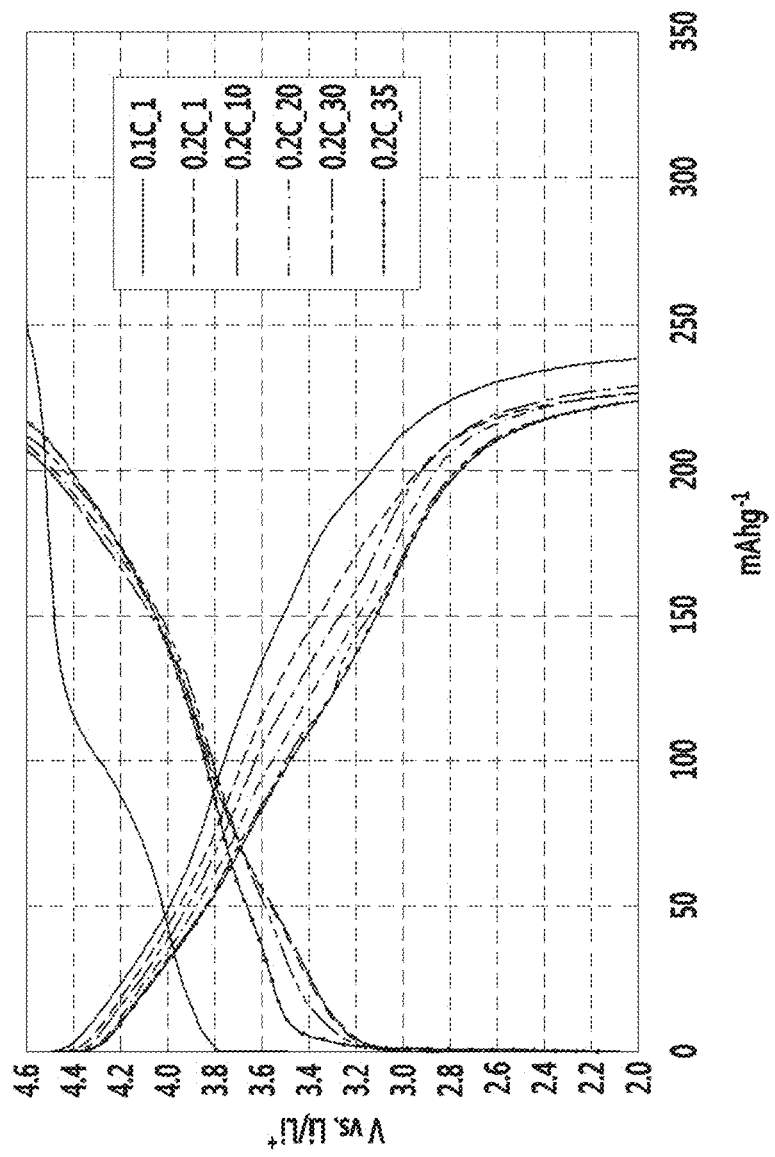
FIG. 6 shows charge and discharge characteristics of a rechargeable lithium battery including the positive active material according to Example 1.
Figure 7:
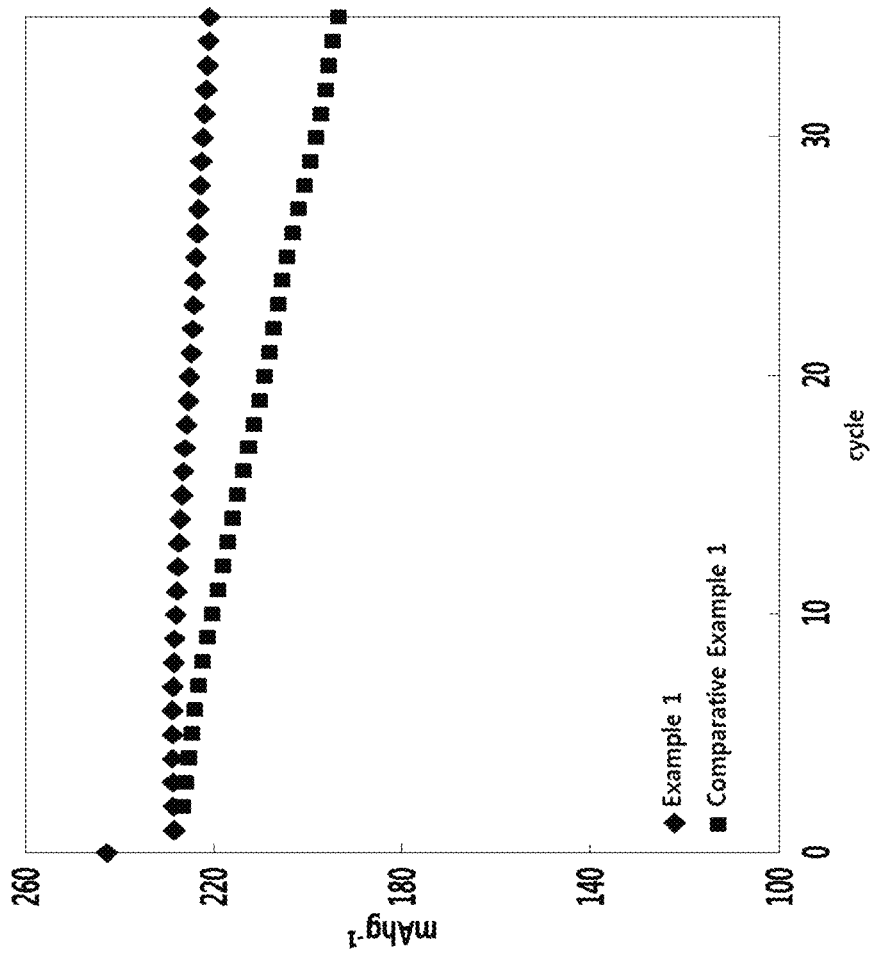
FIG. 7 shows cycle-life characteristics of rechargeable lithium batteries respectively including the positive active materials according to Example 1 and Comparative Example 1.

FIG. 6 shows charge and discharge characteristics of a battery prepared by using the positive active material according to Example 1, and FIG. 7 shows cycle-life characteristics of batteries prepared by using the positive active materials according to Example 1 and Comparative Example 1.

As shown in FIG. 6, the battery using the positive active material of Example 1 was charged and discharged 35 times and discharge capacity was maintained at greater than or equal to 220 mAh/g. Specifically, as shown in FIG. 7 and Table 1, the positive active material of Example 1 shows considerably high discharge capacity of 223 mAh/g after 35 charges and discharges, while the positive active material of Comparative Example 1 showed similar discharge capacity to the positive active material of Example 1 after the first charge and discharge but sharply deteriorated discharge capacity of 197 mAh/g after 35 charges and discharges.

The experiment results show that a positive active material in a method according to the present invention had a uniform composition distribution inside a particle, and a rechargeable battery cell including the positive active material showed excellent cycle-life characteristics.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present invention in any way.

What is claimed is:

1. A precursor of a positive active material for a rechargeable lithium battery wherein the precursor is selected from the group consisting of $Ni_{0.2}Co_{0.1}Mn_{0.7}(OH)_2$, $Ni_{0.25}Co_{0.05}Mn_{0.7}(OH)_2$, and $Ni_{0.2}Co_{0.1}Al_{0.05}Mn_{0.65}(OH)_2$, and a manganese ion concentration deviation in the precursor is within 3 wt % based on a total weight of the precursor.

2. The precursor of the positive active material for a rechargeable lithium battery of claim 1, wherein an average particle diameter (D50) of the precursor of the positive active material for a rechargeable lithium battery is 5 μm to 40 μm.

3. A method of preparing the precursor of a positive active material for a rechargeable lithium battery, comprising:
   a) preparing a metal composite aqueous solution by adding a nickel raw material, a cobalt raw material, and a manganese raw material to an aqueous solution in a co-precipitation reactor in a desired equivalent ratio;
   b) adding an ammonia solution and sodium hydroxide to the metal composite aqueous solution and adjusting distribution of transition metals while pH of the mixed solution is maintained at about 10 to about 12; and
   c) aging the solution at a predetermined temperature for a predetermined time to obtain a metal composite oxide precursor having a formula selected from the group consisting of $Ni_{0.2}Co_{0.1}Mn_{0.7}(OH)_2$, $Ni_{0.25}Co_{0.05}Mn_{0.7}(OH)_2$, and $Ni_{0.2}Co_{0.1}Al_{0.05}Mn_{0.65}(OH)_2$.

4. The method of claim 3, wherein the step b) further comprises agitating the solution at about 1000 rpm to about 3000 rpm.

5. The method of claim 3, wherein the step c) comprises aging the solution at about 10° C. to about 60 for about 4 hours to about 20 hours.

* * * * *